(12) United States Patent
Reichard

(10) Patent No.: US 7,545,859 B2
(45) Date of Patent: Jun. 9, 2009

(54) ADAPTIVE CHANNEL EQUALIZATION TECHNIQUE AND METHOD FOR WIDEBAND PASSIVE DIGITAL RECEIVERS

(75) Inventor: Timothy D. Reichard, Dallas, TX (US)

(73) Assignee: L-3 Communications Integrated Systems L.P., Greenville, TX (US)

( * ) Notice: Subject to any disclaimer, the term of this patent is extended or adjusted under 35 U.S.C. 154(b) by 602 days.

(21) Appl. No.: 10/880,441

(22) Filed: Jun. 29, 2004

(65) Prior Publication Data

US 2005/0152487 A1 Jul. 14, 2005

Related U.S. Application Data

(60) Provisional application No. 60/536,294, filed on Jan. 14, 2004.

(51) Int. Cl.
*H03H 7/30* (2006.01)

(52) U.S. Cl. .................... 375/232; 375/230; 375/233; 375/229; 375/316; 381/103; 381/71.1; 381/71.8; 381/71.11; 333/18; 333/28; 708/323

(58) Field of Classification Search ............... 375/230, 375/229, 232, 233; 708/323; 381/103, 71.1, 381/71.8, 71.11; 333/18, 28
See application file for complete search history.

(56) References Cited

U.S. PATENT DOCUMENTS

| | | | |
|---|---|---|---|
| 4,394,768 A | 7/1983 | Sari | 375/14 |
| 4,408,332 A | 10/1983 | Sari | 375/14 |
| 5,309,378 A | 5/1994 | Beierle | 364/574 |
| 5,317,595 A | 5/1994 | Ostman | 375/14 |
| 5,524,124 A | 6/1996 | Koenig | 375/229 |
| 5,648,987 A | 7/1997 | Yang et al. | 375/232 |
| 5,777,692 A * | 7/1998 | Ghosh | 348/725 |
| 6,115,418 A * | 9/2000 | Raghavan | 375/233 |
| 6,222,592 B1 | 4/2001 | Patel | 348/614 |
| 6,300,984 B1 | 10/2001 | Limberg et al. | 348/614 |
| 6,772,079 B2 * | 8/2004 | Stein et al. | 702/86 |
| 6,952,444 B1 * | 10/2005 | Segal et al. | 375/232 |
| 7,184,476 B2 * | 2/2007 | Lee et al. | 375/232 |
| 2001/0016002 A1 * | 8/2001 | Shim et al. | 375/232 |
| 2001/0033341 A1 | 10/2001 | Limberg | 348/614 |
| 2004/0157646 A1 * | 8/2004 | Raleigh et al. | 455/562.1 |

* cited by examiner

*Primary Examiner*—Shuwang Liu
*Assistant Examiner*—Helene Tayong
(74) *Attorney, Agent, or Firm*—O'Keefe, Egan, Peterman & Enders, LLP

(57) ABSTRACT

An adaptive channel equalization technique and method for wideband passive receivers is disclosed that reduces and tends to minimize distortions caused by circuitry within passive digital receivers. This equalization architecture provides an adaptive equalization solution for a wideband passive channel that receives unknown signals from the RF environment both temporally and spectrally. A wideband chirp signal or calibration signal is periodically injected to capture the spectral response of the receiver channel as it varies from the distortions induced over time and temperature for synthesis of equalization filter coefficients. Thus, the channel equalization is performed independent of receiver signal source and is employed to minimize digital receiver signal measurement distortions across the passband by providing an equalization filter whose magnitude and phase response compensates for the channel distortions of the passive data collection system.

27 Claims, 5 Drawing Sheets

ADAPTIVE CHANNEL EQUALIZATION TECHNIQUE AND METHOD FOR WIDEBAND PASSIVE DIGITAL RECEIVERS

RELATED APPLICATIONS

This application claims priority to the following co-pending provisional application: Provisional Application Ser. No. 60/536,294, which was entitled "ADAPTIVE CHANNEL EQUALIZATION TECHNIQUE AND METHOD FOR WIDEBAND PASSIVE DIGITAL RECEIVERS" and was filed on Jan. 14, 2004.

GOVERNMENT RIGHTS

This invention was made with United States Government support from the Department of the Air Force under Contract No. F33657-00-G-4029. The Government has certain rights in this invention.

TECHNICAL FIELD OF THE INVENTION

This invention relates to techniques and architectures for reception of electromagnetic radiation by receivers and, more particularly, passive digital receivers.

BACKGROUND

Receiver signal paths, or channels, of electronic data collection systems (such as airborne electronic receiver systems for unknown input signal spectrums) are often prone to multiple, dynamic sources of distortion that color the channel due to a temperature-time varying environment. As a received signal moves from the antenna through RF (radio frequency) amplifiers, distribution networks, switches and tuners, signal distortions may appear in terms of both frequency and time. The channel distortions may introduce nonlinear effects on the signal's magnitude and phase, especially across the IF (intermediate frequency) filter passband, which color the waveform signature and can affect signal measurement accuracies in time and frequency.

Where the sources of the collected input signals across the receiver wideband spectrum are expected to be unknown before reception, as is the case with respect to passive wideband electronic surveillance receivers, any attempts to equalize the channel must be performed without apriori knowledge because the signal sources, in all respects, are unknown. Furthermore, situations involving receipt of low-probability-of-intercept (LPI) type emitters demand measurement accuracies both at the time of the intercept and instantaneous frequency coincidence of the intercept, usually off band center, thereby stressing the need for low distortion spectral response characteristics across the passband of the passive wideband surveillance receiver. Traditional solutions for channel equalization have failed to adequately handle distortions caused by environmental parameters, such as temperature and other operational conditions.

SUMMARY OF THE INVENTION

The present invention is an adaptive channel equalization technique and method for wideband passive receivers. The adaptive equalization method and technique of the present invention, as described in more detail below, provides a solution that reduces and tends to minimize the passive digital receiver signal distortions. This equalization architecture provides an adaptive equalization solution for a wideband passive channel that receives unknown signals from the RF environment both temporally and spectrally. A wideband chirp signal or calibration signal is periodically injected to capture the spectral response of the receiver channel as it varies from the distortions induced over time and temperature for synthesis of equalization filter coefficients. Thus, the channel equalization is performed independent of receiver signal source and is employed to minimize digital receiver signal measurement distortions across the passband by providing an equalization filter whose magnitude and phase response compensates for the channel distortions of the passive data collection system. In operation, magnitude and phase response of the equalization filter cascades with the channel to produce an overall transfer function that is linear in phase and as close to unity magnitude as realistically possible.

In one embodiment, the present invention is a wideband passive receiver system having channel equalization, including a wideband passive receiver coupled to receive an RF input signal spectrum or to receive a calibration input signal where the receiver is configured to output digital signals representing the RF input signal spectrum or the calibration input signal, an equalizing filter coupled to receive the digital signals from the receiver where the filter has a filter response controlled by filter control signals and being configured to output filtered digital signals, a calibration signal generator configured to generate a wideband calibration signal to provide the calibration input signal for the receiver and configured to generate a desired output signal, and equalizer control circuitry coupled to receive the filtered digital signals as feedback and coupled to receive the desired output signal from the calibration signal generator where the equalizer control circuitry is configured to generate the filter control signals and where the filter control signals is configured to correct distortions caused by operational variations in transfer function characteristics of the receiver system. More particularly, the distortions can include distortions inherent to analog circuitry within the receiver system that may cause variations in the transfer function characteristics due to internal or external operational conditions. And the analog circuitry has a nonlinear transfer characteristics that may vary in time during operation. In addition, the calibration input signal can include a plurality of wideband calibration signals generated periodically to provide calibration dwells for the receiver system. As described below, other features and variations can be implemented, if desired, and a related method can be utilized, as well.

In another embodiment, the present invention is a channel equalizer system for a wideband passive receiver, including an equalizing filter coupled to receive digital signals from a receiver where the filter has a filter response controlled by filter control signals and being configured to output filtered digital signals, a calibration signal generator configured to generate a wideband calibration signal to provide as a calibration input signal to the receiver and configured to generate a desired output signal, and equalizer control circuitry coupled to receive filtered digital signals as feedback and coupled to receive the desired output signal from the calibration signal generator where the equalizer control circuitry being configured to generate the filter control signals and where the filter control signals being configured to correct distortions caused by operational variations in transfer function characteristics of the receiver system. As described below, other features and variations can be implemented, if desired, and a related method can be utilized, as well.

In a further embodiment, the present invention is a method for equalizing a channel within a wideband passive receiver system, including receiving an RF input signal spectrum or an injected calibration input signal and processing the input signal to produce digital output signals, filtering the digital signals to produced equalized digital output signals where the filtering is controlled by filter control signals, generating a wideband calibration signal to provide the injected calibration input signal and generating a desired output signal, and processing the equalized digital output signals as feedback and the desired output signal to generate the filter control signals where the filter control signals are configured to correct distortions caused by operational variations in transfer function characteristics of the receiver system. In addition, the generating step can include generating a plurality of wideband calibration signals to provide periodic calibration dwells for the receiver system. And the processing step can include subtracting the feedback signal from the desired output signal to produce an error correction signal and utilizing the error correction signal to generate the filter control signals. As described below, other features and variations can be implemented, if desired, and a related circuits and systems can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

The present invention provides an adaptive channel equalization technique and method for wideband passive receivers that reduces and tends to minimize the passive digital receiver signal distortions caused by environmental operation parameters.

Figure 1:
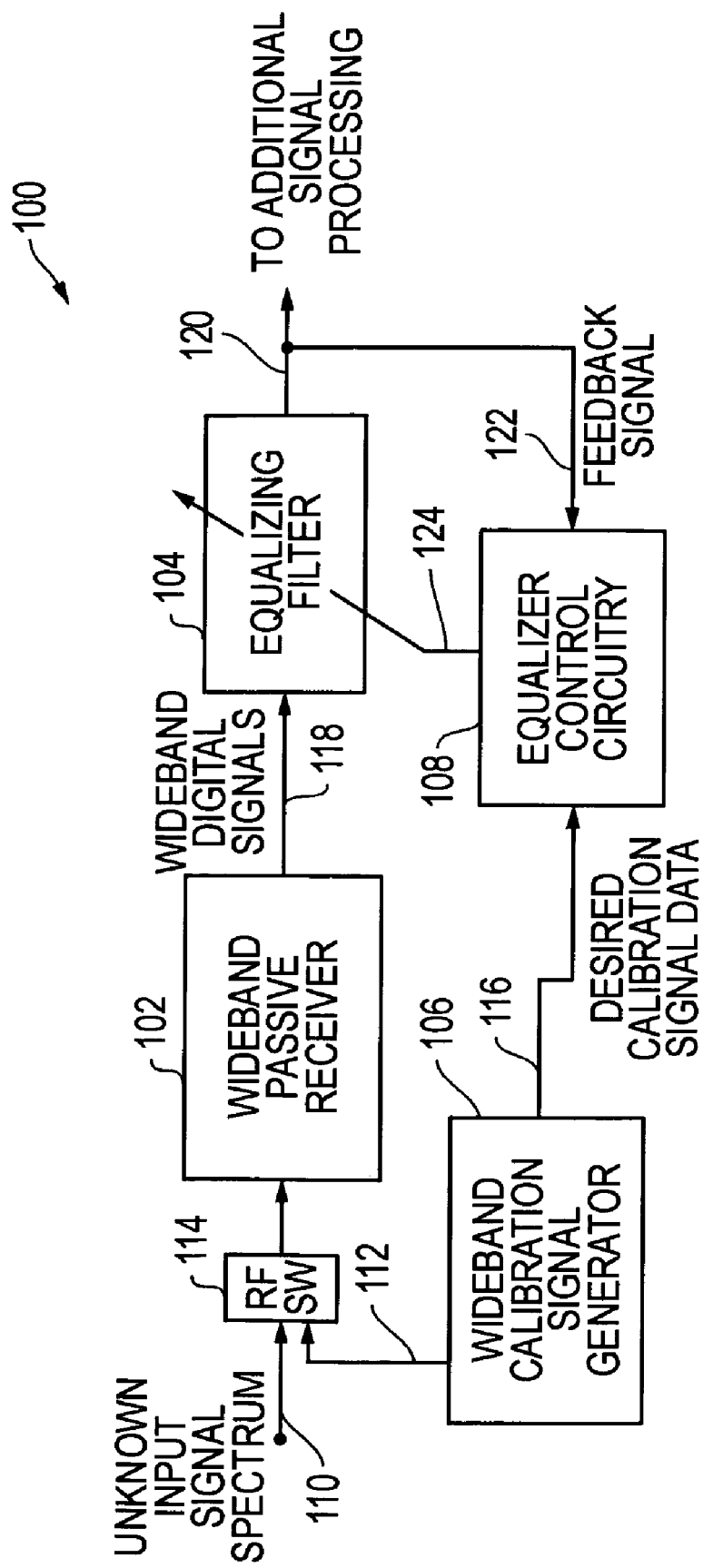
FIG. 1 is a block diagram of an embodiment for a wideband passive digital receiver including an adaptive channel equalization filter that uses a wideband calibration signal.

FIG. 1 is a block diagram of an embodiment 100 for a wideband passive digital receiver including an adaptive channel equalization filter 104 that uses a wideband calibration signal 112. As depicted, the receiver system 100 includes a wideband passive receiver 102, an equalization filter 104, equalizer control circuitry 108, a wideband calibration signal generator 106, and an RF switch (RF SW) 114. The input signal is typically a radio-frequency spectrum from unknown signal sources. This unknown input signal spectrum is processed by the wideband passive digital receiver 102 and the equalizing filter 104 to produce digital output signals 120 that can be subjected to further desired processing. The adaptive channel equalization filter 104 and the novel calibration technique of the present invention that utilizes a wideband calibration signal 112 allows for equalization of tuning errors induced by the receive path circuitry itself across the wideband range of the receiver 102. In operation the wideband passive digital receiver 100 includes (1) a calibration mode where wideband calibration signals 112 are used to set the filter tap control signals 124 of the equalization filter 104 and (2) a operation mode where the input signal spectrum is received and converted into digitally filtered output signals 120.

It is noted that a passive receiver refers to a receiver that listens to or receives RF energy in such a way that the receiver does not communicate its presence to the transmitting sources for the RF energy. It is also noted that a wideband receiver refers to a receiver having a passband for receiving signals that are at least about plus-or-minus 5% from a center frequency, that may be as much as 30% or more above or below the center frequency and preferably for receiving signals that extend up to about 45% or more above or below the center frequency. For example, a receiver that has a passband centered at about 200 MHz would be a wideband receiver if it was configured to receive signals in a passband between about 180-220 MHz or greater. It is further noted that a wideband calibration signal refers to a signal that includes spectral content that spans about 80% or more of the passband for the wideband receiver. It is further noted that although FIGS. 1 and 2A-C provide example embodiments of a single receive channel, multiple receive channels may be utilized and an adaptive equalization filter can be utilized for each channel.

In calibration mode, the wideband calibration signal generator 106 outputs a wideband calibration signal 112 that is provided to the wideband passive receiver 102 through RF switch (RF SW) 114. The receiver 102 processes the calibration signal 112 and outputs wideband digital signals 118. These wideband digital signals 118 are expected to include some level of distortion due to environmental parameters experienced by the receiver 102, such as external temperature and increased temperature due to operation of the circuitry of the receiver 102 itself, thereby causing nonlinear magnitude and group delay distortions in the receiver's spectral response characteristics in the passband. The equalizer 104 in turn processes the wideband digital signals 118 and outputs digital signals 120, which can be real or complex. For the calibration mode, the equalizer control circuitry 108 receives a feedback signal 122, for example, from the output of the equalizing filter 104, and receives a signal 116 from the wideband calibration signal generator that represents data relating to the desired calibration signal that would be output by the wideband passive receiver 102 if no unwanted distortions were being generated by the receiver 102, including distortions due to environmental conditions within which the receiver 102 is operating. The equalizer control circuitry 108 processes the desired calibration signal data 116 and the feedback signal 122 and then generates FIR filter correction signals consisting of updated tap coefficients 124, which are applied to the equalizing filter 104. In this way, the receiver system 100 provides adaptive channel equalization that corrects for distortions caused by the wideband passive receiver 102 itself.

In operation mode, the wideband passive receiver 102 receives an input signal spectrum 110 through RF switch (RF SW) 114. More particularly, the passive receiver system 100 is directed to receiving input signal spectrums 110 that are from unknown sources, such that the nature of the received signals are not usually known before they are received. The receiver 102 processes the unknown input signal spectrum 110 and outputs wideband digital signals 118. The equalizing filter 104, as controlled by the filter correction signal 124, then processes the digital signals 118 to generate digital output signals 120. These digital output signals are then sent to additional circuitry and/or devices for additional signal processing, as desired. For example, this additional signal processing can attempt to identify the sources of signals received within the input signal spectrum 110.

The wideband calibration signal 112 is configured to provide a calibration signal that spreads across the wide spectrum of the wideband passive receiver 102. As it operates, the receiver system 100 periodically enters calibration modes where it synthesizes an adaptive set of FIR equalization filter coefficients by injection of the wideband calibration signal 112, or chirp signal, in order to capture the analog spectral magnitude and frequency response characteristics of the non-linear aspects of the receiver channel for the passive receiver 102. These equalization filter coefficients are represented by the filter correction signal 124 and can be determined without prior knowledge of the transfer function of the RF-IF channel within the receiver 102. These fiter coefficients are selected so as to restore phase linearity and flatten the spectral magnitude and group delay variation across the channel passband. The resultant equalization filter 104 is then employed in the channel to reduce and ideally minimize channel aberrations while signals are collected and processed by the wideband passive receiver 102 from the RF environment to further digital processing.

This equalization architecture, as represented by the example embodiment in FIG. 1, provides an adaptive equalization solution for a wideband passive channel that receives unknown signals from the RF environment both temporally and spectrally. No apriori information must be known with regard to the signal sources being processed. The wideband chirp signal or calibration signal 112 is periodically injected to capture the spectral response of the receiver channel as it varies from the distortions induced over time and temperature for synthesis of an equalization filter coefficients for the filter 104. Thus, the channel equalization is performed independent of receiver signal source and is employed to minimize digital receiver signal measurement distortions across the passband by providing an equalization filter 104 whose magnitude and phase response compensates for the channel distortions of the passive data collection system.

More detailed architecture examples are described with respect to FIGS. 2A-2C below for implementations in embedded CPUs (central processing units) or DSPs (digital signal processors). These architectures may also be used as the basis for implementation with FPGA (field programmable gate array) firmware design architecture, if desired.

Figure 2A:
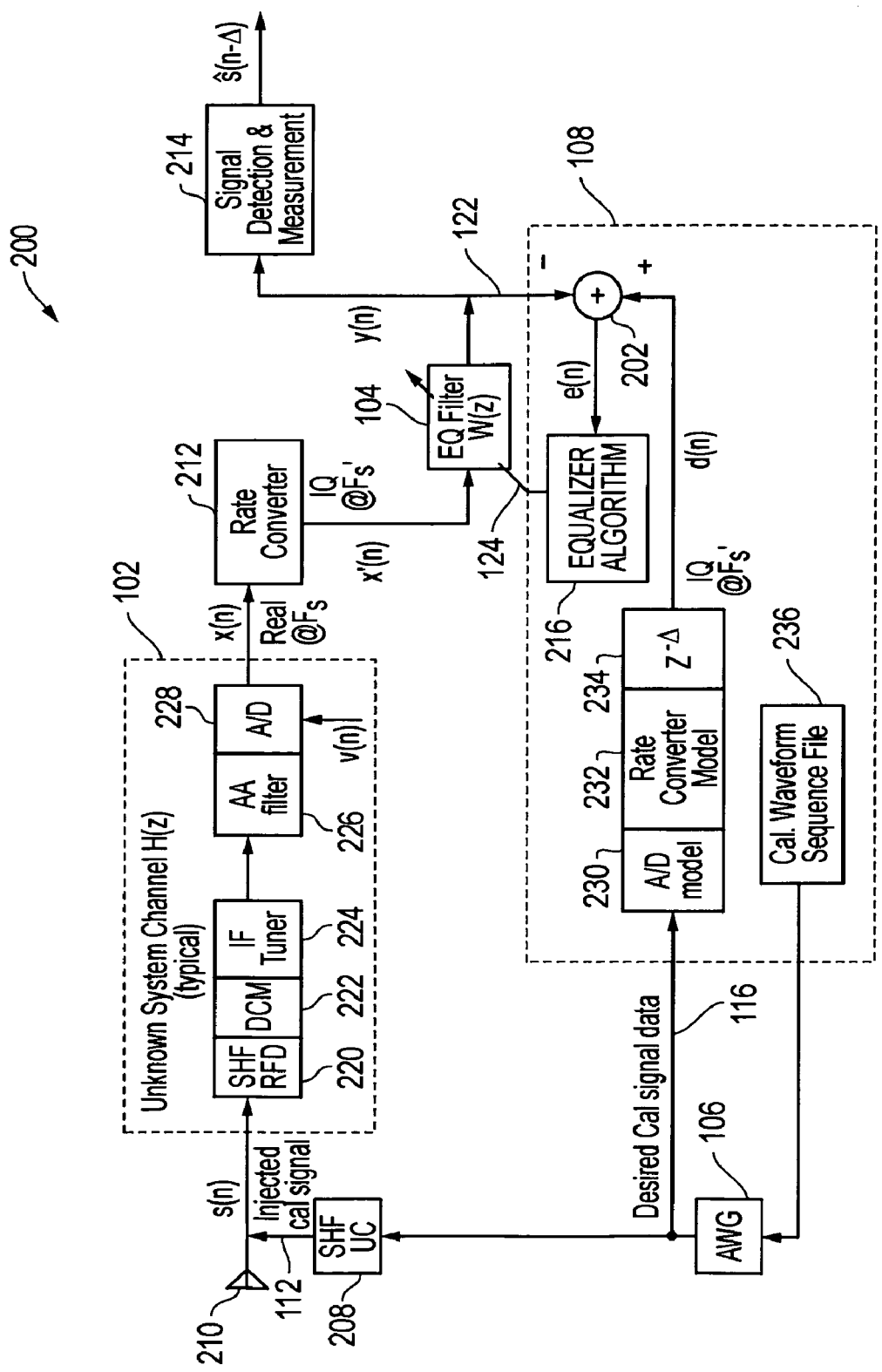
FIG. 2A is a more detailed block diagram of an embodiment for a wideband passive digital receiver including an equalization filter that uses a wideband calibration signal and where the input signal spectrum is not known to the receiver system.

FIG. 2A is a more detailed block diagram of an embodiment for a wideband passive digital receiver including an equalization filter that uses a wideband calibration signal and where the input signal spectrum is not known to the receiver system. In particular, embodiment 200 includes a receiver 102 with an unknown system channel transfer function H(z), a sample rate converter 212, a signal detection and measurement block 214, an equalization (EQ) filter 104 with a filter transfer function W(z), equalizer control circuitry 108, a calibration chirp signal generator (AWG) 106, and a super high-frequency, RF up-converter (SHF UC) 208. The receiver 102 includes an SHF RF distribution Network (RFD) 220, a down conversion module (DCM) 222, an IF tuner 224, an anti-aliasing (AA) filter 226 and an analog-to-digital (A/D) converter 228. System noise is represented by signals v(n). The equalizer control circuitry includes an A/D converter 230 that is a model of A/D converter 228, a rate converter 232 that is a model of rate converter 212, and a delay block ($z^{-\Delta}$) 234. The equalizer control circuitry 108 also includes equalizer algorithm control circuitry 216, which receives an error signal e(n) from adder 202, and adder 202, which receives as a negative input the feedback signal 122 from the equalizing filter 104 and receives as a positive input the output signal from the delay block 234. The equalizer control circuitry 108 further includes a calibration waveform sequence file 236.

During operation mode, the antenna 210 receives RF spectrum signals s(n). The receiver 102 processes this input signal to produce digitized spectrum signals x(n), which in the embodiment depicted are real digitized signals at the sampling frequency (Fs) of the A/D converter 228. The rate converter 212 then processes these digital real signals x(n) to produce real (I) and imaginary (Q) complex digital signals x'(n) at a second sampling frequency (Fs'). The equalization filter 104 processes these complex digital signals to produce equalized complex digital output signals y(n). These output signals can then be processed as desired, such as with the signal detection and measurement circuitry 214 that can produce a received signal stream estimate represented by s_hat (n−Δ).

During calibration mode, a calibration signal 112 is injected into the signal path instead of a signal from antenna 210. This calibration signal is processed by the receiver 102, the rater converter 212 and the equalizing filter 104, as discussed above. The calibration signal is generated by the AWG block 106. The AWG block 106 utilizes waveforms from the calibration waveform sequence file 236 to produce a calibration signal that is then up-converted by SHF UC 208. Desired calibration signal data 116 is provided to the equalizer control circuitry 108, and this data 116 includes information related to what signal is expected to be produced by the receiver 102, the rater converter 212 and the equalizing filter 104 if no errors were introduced by this circuitry. The A/D model 230, the rater converter model 232 and the delay block 234 utilize this data 116 to produce desired complex (I and Q) digital signals d(n) at the second sampling frequency (Fs'). The adder 202 subtracts the feedback signal 122 from this desired signal d(n) to produce an error signal e(n) that is provided to the equalizer algorithm control circuitry 216. The equalizer algorithm control circuitry 216 utilizes this error signal to generate the control signals 124 that determine the response for the equalizing filter 104, for example, by defining filter coefficients. Through this calibration routine, errors induced by the receive path circuitry can be corrected.

The adaptive digital channel equalization architecture of the present invention, including the embodiment 200 in FIG. 2A, provides significant advantages. The channel equalizer architecture, including equalizing filter 104 and equalizer control circuitry 108, may be employed for use in passive electronic intelligence (ELINT) collection systems or other suitable applications in which the transmitting signal origins for location, center frequency or symbol set are not known be the receiving system. The method of the adaptive channel equalization or compensation begins by configuration of the receiver collection system to perform dedicated calibration data collection dwells. A known wideband calibration signal is provided by an Arbitrary Waveform Generator (AWG) or chirp generator equivalent, up-converted to RF and injected into the front end of the system, preferably at the antenna port, as depicted in FIG. 2A. As an example, this calibration signal can consist of a linear-frequency modulated (LFM), or chirp, pulsed waveform. Unlike channel equalization of standard sub-band communications channels, equalization of the ELINT receiver channel is preferably performed across the entire passband (typically 80 MHz or greater) because the signals processed are of unknown carrier frequency origin. The required calibration signal, therefore, will preferably excite as much of the bandpass filter as possible in order to obtain sufficient spectral response coverage both in amplitude and phase. The frequency extent of the calibration signal used for the embodiment 200 can be $f_c$−50 MHz to $f_c$+50 MHz with the center frequency $f_c$ in a range of about 80-200 MHz and with a chirp repetition interval that maintains a duty cycle within the 50 to 75% range.

The operation of embodiment 200 is now explained in further detail with respect to an ELINT system. The input signal, represented as s(n), passes through the unknown system channel, H(z), typically including RF preselectors and a distribution network represented by SHF RFD 220, RF-IF frequency down conversion module (DCM) 222, IF tuner 224, anti-aliasing filter 226 and A/D converter 228. The system noise is represented as additive Gaussian noise, v(n), at the digitizer which is typically modeled as a function of the total RF front end noise figure, A/D quantization level and A/D input impedance: The digitized, real-valued data stream, x(n), is rate-converted to provide samples at rate Fs' to the FIR equalizer filter 104. The AWG 106 provides a digital version of the injected calibration signal waveform, which is sent through A/D and rate conversion models 230 and 232, delayed by Δ samples in delay block 234 and is provided as d(n) to the adaptive equalizer algorithm circuitry 216. The adaptive equalizer algorithm iterates the filter coefficient weights, w(n), according to the adaptive algorithm technique employed, until the distorted channel error, modified by the weights, converges to an acceptable minimum-mean-squared-error (MMSE) level with respect to the desired signal d(n). At the end of the calibration dwell processing, the synthesized final set of equalizer FIR filter coefficients are loaded into the FIR filter, W(z), 104 through control signals 124. The ELINT system then resumes operational mode dwell collections with the AWG signal injection switched off and with the equalizer filter coefficients from the last calibration dwell employed in the cascaded FIR filter until its time for another calibration dwell. This channel equalization process can be performed independently for each receiver channel and selectable bandpass filter and repeated at periodic time intervals, which can be selected as desired.

Figure 2B:
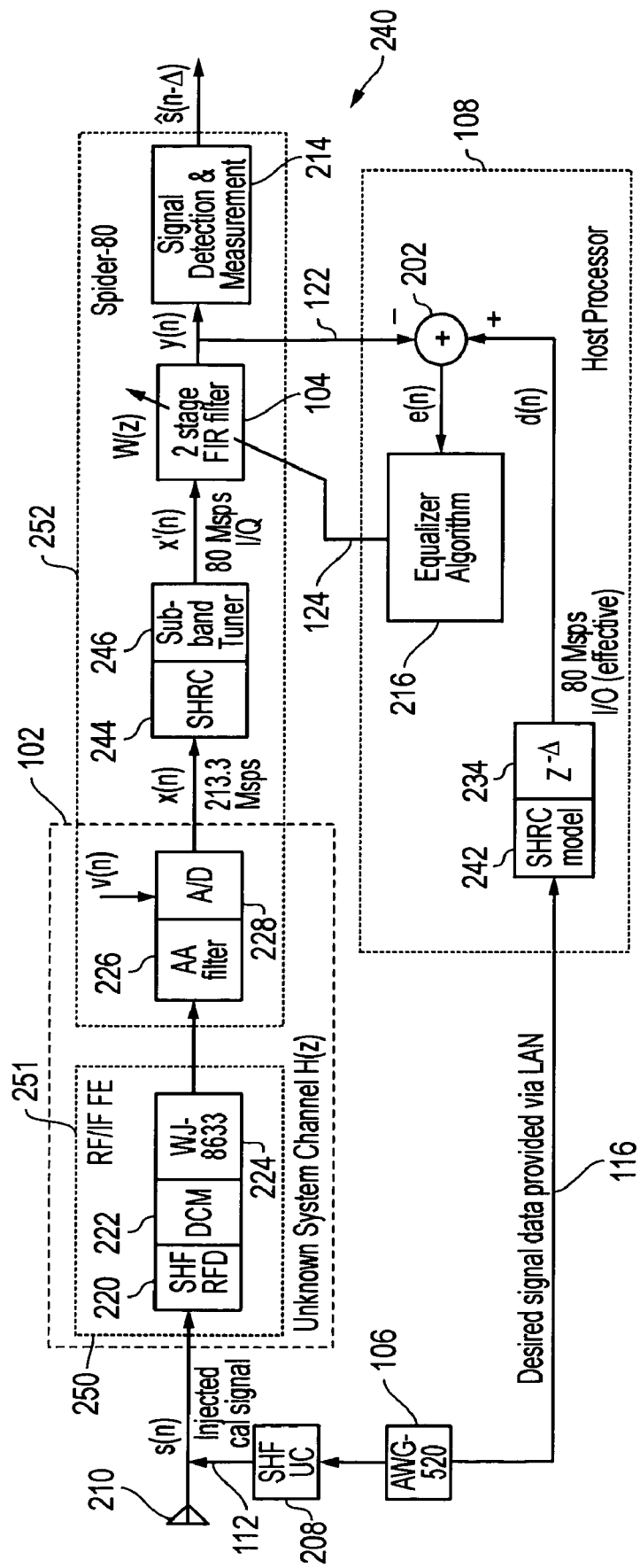
FIG. 2B is a block diagram of an alternative embodiment for a wideband passive digital receiver including a channel equalizer for complex-valued digitized signals.

FIG. 2B is a block diagram of an alternative embodiment for a wideband passive digital receiver including a channel equalizer for complex-valued digitized signals. In particular, embodiment 240 includes a receiver 102 with an unknown system channel transfer function H(z), a super-heterodyne rate converter (SHRC) 244, a sub-band tuner 246, a signal detection and measurement block 214, an equalization (EQ) filter 104 with a filter transfer function W(z), equalizer control circuitry 108, a calibration chirp signal generator (AWG-520) 106, and a super high-frequency, RF up-converter (SHF UC) 208. The receiver 102 includes a SHF RFD 220, a DCM 222, an IF tuner (WJ-8633) 224, an anti-aliasing (AA) filter 226 and an analog-to-digital (A/D) converter 228. System noise is again represented by signals v(n). The equalizing filter 104 is a 2-stage FIR filter. The equalizer control circuitry includes a SHRC 242 that is a model of SHRC 244 and a delay block ($z^{-\Delta}$) 234. The equalizer control circuitry 108 also includes equalizer algorithm control circuitry 216, which receives an error signal e(n) from adder 202, and adder 202, which receives as a negative input the feedback signal 122 from the equalizing filter 104 and receives as a positive input the output signal from the delay block 234. In the embodiment 240 depicted, elements 220, 222 and 224 are combined together into a device 251 designated as the RF/IF front-end (FE) device. It is noted that the WJ-8633 tuner is available from DRS Technologies. Elements 226, 228, 244, 246, 104 and 214 are combined together in a device 252 designated as the Spider-80 device. And the equalizer control circuitry 108 is designated as a host processor device.

During operation mode, the antenna 210 receives RF spectrum signals s(n). The receiver 102 processes this input signal to produce digitized spectrum signals x(n), which in the embodiment depicted are real digitized signals at the sampling frequency of the A/D converter 228, such as 213.3 million samples per second (Msps). The SHRC 244 and sub-band tuner 246 then process these digital real signals x(n) to produce real (I) and imaginary (Q) complex digital signals x'(n) at a second sampling frequency, such as 80 Msps. The equalization filter 104 processes these complex digital signals to produce equalized complex digital output signals y(n). These output signals can then be processed as desired, such as with the signal detection and measurement circuitry 214 that can produce a received signal stream represented by s_hat(n−Δ).

During calibration mode, a calibration signal 112 is injected into the signal path instead of a signal from antenna 210. This calibration signal is processed by the receiver 102, the SHRC 244, the sub-band tuner 246 and the equalizing filter 104, as discussed above. The calibration signal is generated by the AWG block 106 and then up-converted by SHF UC 208. Desired calibration signal data 116 is provided to the equalizer control circuitry 108 through a local area network (LAN), and this data 116 includes information related to what signal is expected to be produced by the receive path circuitry if no errors were introduced by this circuitry. The SHRC model 242 and the delay block 234 utilize this data 116 to produce desired complex (I and Q) digital signals d(n) at the second sampling frequency or at an effective rate of 80 Msps for this example embodiment. The adder 202 subtracts the feedback signal 122 from this desired signal d(n) to produce an error signal e(n) that is provided to the equalizer algorithm control circuitry 216. The equalizer algorithm control circuitry 216 utilizes this error signal to generate the control signals 124 that determine the response for the equalizing filter 104, for example, by defining the filter coefficients for the 2-stage FIR filter in the embodiment depicted. Through this calibration routine, errors induced by the receive path circuitry can be corrected.

To describe the embodiment 240 of FIG. 2B in more detail, this embodiment represents an embodiment of the present invention whereby the digitization, rate conversion, equalization filter, signal detection and parameter measurement functions are performed by the Spider-80 digital receiver hardware available from the Integrated Systems division of L-3 Communications. The equalization FIR filter 104 consists of a 16-tap complex digital FIR implementation in a GC2011A Graychip programmable digital filter. The channel data is input to the digitizer where it is sampled at 213.33 million samples per second (Msps) and then fed through a 4:3 Super-Heterodyne Rate Converter (SHRC) 244 that converts the real samples to complex. The channel data output from the rate conversion function is 80 Msps complex samples. The IQ data stream for the calibration dwell, represented by y(n), is sent to a host processor 108 for input into the adaptive equalizer algorithm. The AWG 106 also provides the digital version of the injected chirp calibration signal waveform over a local area network (LAN) or equivalent data bus to the equalizer algorithm 216 resident in the host processor 108. The adaptive equalizer technique employed for embodiment 240 can be a recursive least squares (RLS) algorithm.

In order to obtain fast error convergence and especially for situations involving large eigenvalue spread or signal statistics which vary rapidly with time, the least squares criterion is based on the MSE (mean squared error) and is used directly on the input data sequence x'(n). One objective of the RLS algorithm is to find the filter coefficient vector that minimizes the weighted sum of the magnitude-squared errors:

$$\mathcal{E}_N^n = \sum_{m=0} \beta^{n-m} |e_N(m,n)|^2$$

where; β is a weighting factor in the range of 0<β≦1, and e(m,n)=d(m)−y(m,n).

For the RLS adaptive filter algorithm, the MSE estimate: ξ(n)=ξ$_{min}$+trace[k(n−1)R]; and the tap weight vector adaptation w(n), the Kalman gain vector k(n), the inverse projection matrix, P$^{-1}$ and misadjustment M$_{RLS}$ are determined by the following relations:

w(n)=w(n−1)+k(n) e(n)

where;

k(n)=[λ+x$^T$(n)f(n)]$^{-1}$f(n)

f(n)=P$^{-1}$(n−1)x*(n)

P$^{-1}$(n)=λ$^{-1}$(P$^{-1}$(n−1)−k(n)[x$^T$(n)P$^{-1}$(n−1)])

and,

M$_{RLS}$=(1−λ)N/(1+λ)

Each of these equations are computed for every new sample, n. λ is a "forgetting factor" where λ<1. More emphasis is placed on recent samples of the observed data as the value chosen for λ approaches closer to 1. This algorithm implements a user specified M$_{RLS}$ and λ is calculated initially from the same equation above but algebraically solved for λ. In addition, λ is updated after each weight adaptation, λ(n), as follows:

β(n−1)=1−λ(n−1)

β(n)={1+psign[e(n)e(n−1)]×sign [x$^T$(n)k(n−1)]}β(n−1)

λ(n)=1−β(n)

if λ(n)>λ$^+$, λ(n)=λ$^+$ if λ(n)<λ$^-$, λ(n)=λ$^-$

Initializations consist of: w(n≦0)=0 and, P$^{-1}$(0)=δ$^{-1}$I where δ is a small positive constant.

Figure 2C:
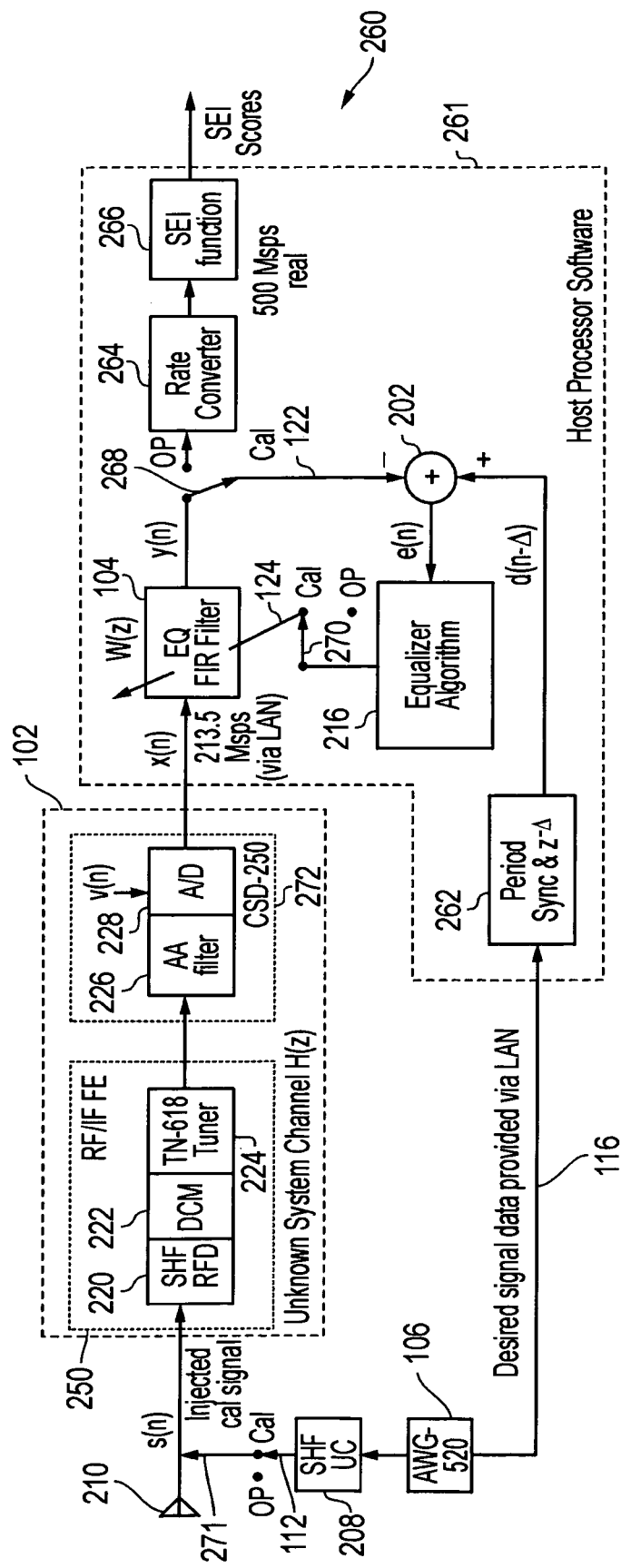
FIG. 2C is a block diagram of another alternative embodiment for a wideband passive digital receiver including a channel equalizer for real-valued digitized signals.

FIG. 2C is a block diagram of another alternative embodiment for a wideband passive digital receiver including a channel equalizer for real-valued digitized signals. In particular, embodiment 260 includes a receiver 102 with an unknown system channel transfer function H(z), a rate converter 264, specific emitter identification (SEI) circuitry 214, an equalization (EQ) filter 104 with a filter transfer function W(z), equalizer algorithm control circuitry 266, period synchronization and delay (z$^{-Δ}$) circuitry 262, a calibration chirp signal generator (AWG-520) 106, and a super high-frequency, RF up-converter (SHF UC) 208. The receiver 102 includes a SHF RFD 220, a DCM 222, an IF tuner (TN-618) 224, an anti-aliasing (AA) filter 226 and an analog-to-digital (A/D) converter 228. System noise is represented by signals v(n). The equalizing filter 104 is a FIR filter. The equalizer algorithm control circuitry 216 receives an error signal e(n) from adder 202. Adder 202 in turn receives as a negative input the feedback signal 122 from the equalizing filter 104 and receives as a positive input the output signal from the block 262. In the embodiment 260 depicted, elements 220, 222 and 224 are combined together into a device 250 designated as the RF/IF front-end (FE) device. Elements 226 and 272 are combined together in a device 272 designated as the CSD-250 device. And elements 104, 264, 266, 262, 202 and 216 are combined together in a device 261 designated as the host processor.

During operation (OP) mode, the antenna 210 receives RF spectrum signals s(n). The receiver 102 processes this input signal to produce digitized spectrum signals x(n), which in the embodiment depicted are real digitized signals at the sampling frequency of the A/D converter 228, such as 213.5 Msps. These digitized spectrum signals x(n) can also be communicated to the equalization filter 104 through a LAN, when desired. The equalization filter 104 then processes these digital signals x(n) to produce equalized digital output signals y(n). These output signals can then be processed as desired, such as with rate converter 264 and with the SEI function circuitry 266 to produce SEI scores for received signal streams. The switch 268 selects between an operation mode (OP) path and a calibration (CAL) mode path.

During calibration mode, a calibration signal 112 is injected into the signal path instead of a signal from antenna 210. The switch 271 selects between an operation mode (OP) path and a calibration (CAL) mode path. The calibration signal is processed by the receiver 102 and the equalizing filter 104, as discussed above. The calibration signal is generated by the AWG block 106 and then up-converted by SHF UC 208. Desired calibration signal data 116 is provided to the equalizer control circuitry 108 through a local area network (LAN), and this data 116 includes information related to what signal is expected to be produced by the receive path circuitry if no errors were introduced by this circuitry. The period synchronization and delay (z$^{-Δ}$) circuitry 262 utilizes this data 116 to produce desired digital signals d(n). The adder 202 subtracts the feedback signal 122 from this desired signal d(n) to produce an error signal e(n) that is provided to the equalizer algorithm control circuitry 216. The equalizer algorithm control circuitry 216 utilizes this error signal to generate the control signals 124 that determine the response for the equalizing filter 104, for example, by defining the filter coefficients for the FIR filter in the embodiment depicted. The switch 270 selects between an operation mode (OP) path, where the calibrated controls signals 124 are utilized, and a calibration (CAL) mode path where the control signals 124 are calibrated. Through this calibration routine, errors induced by the receive path circuitry can be corrected.

To describe the embodiment 260 of FIG. 2C in more detail, this embodiment is an embodiment for an adaptive channel equalizer invention for real-valued digitized signals for the purposes of supporting a specific emitter Identification (SEI) function. This embodiment uses a CSD-250 digital receiver, which is a product of Condor Systems, along with an IF wideband tuner (TN-618 tuner). The CSD-250 configuration is similar to that of the Spider-80 configuration except the equalization FIR filter 104 is real-valued with 72 adaptive filter weighting coefficients and is implemented within the host processor equalization function. The digitized data is collected at 213.5 Msps real-valued and input into the adaptive equalization function prior to rate conversion. The adaptive equalizer technique employed for this embodiment 260 can be a Block Least Mean Squares (BLMS) algorithm.

A Least Mean Squares (LMS) algorithm was first proposed by Widrow and Hoff in 1960 and is one of the most widely used adaptive filtering algorithms in practice. This algorithm is popular primarily due to its simplicity and robustness for signal processing applications. The conventional algorithm is a stochastic implementation of the steepest descent algorithm applied to the next sample for adaptation of the filter weights w such that:

$$w(n+1)=w(n)+\mu \nabla e^2(n)$$

where; $\mu$=step size parameter, $e^2(n)$ is the instantaneous coarse error estimate, n is the sample index and $\nabla$ is the gradient operator column vector:

$$\nabla=[\partial/\partial w_0 \partial/\partial w_1 \ldots \partial/\partial w_{N-1}]^T$$

Solving for $\nabla e^2(n)$ and knowing that $e(n)=d(n)-y(n)$, it is found that:

$$\partial e^2(n)/\partial w_i = 2e(n)\,[\partial e(n)/\partial w_i] = 2e(n)\,[-\partial y(n)/\partial w_i + \partial d(n)/\partial w_i]$$

$d(n)$ is not a function of $w_i$ so it's treated as a constant wrt $w_i \Rightarrow \partial d(n)/\partial w_i = 0$. Therefore;

$$\nabla e^2(n) = -2e(n)x(n)$$

The LMS recursion equation becomes:

$$w(n+1)=w(n)+2\mu e^*(n)x(n)$$

and $$y(n)=w^H(n)x(n)$$

with initialization: $w(n \leq 0)=0$ $\mu$ is the step-size parameter that is selected in order to achieve the desired filter convergence performance. $\mu$ is determined from the desired "Misadjustment", M, which is the ratio of the excess Mean Squared Error (MSE), $\xi_{excess}$, to the steady state minimum MSE ($\xi_{min}$):

$$\mu \sim M/\mathrm{trace}\,[R_{xx}] \text{ for } M \leq 0.1$$

where; $M_{LMS}=\xi_{excess}/\xi_{min}$ and $R_{xx}$ is the correlation matrix

A Block LMS algorithm is a special implementation of the LMS algorithm where a block of data samples from the filter input and the desired output are collected and then processed together to obtain a block of output samples. This involves a serial to parallel conversion of the input data, parallel processing on block data boundaries and parallel-to-serial conversion for the output data. The filter tap weights are updated once after the collection of each block of data samples. The gradient vector used to update the filter tap weights is an average of the instantaneous gradient vectors of the standard LMS form and is calculated during the current block, k. The weight update recursion for the BLMS is defined as:

$$\underline{w}(k+1) = \underline{w}(k) + 2\mu_B \frac{\sum_{i=0}^{L-1}(\underline{e}*(kL+i)\underline{x}(kL+i))}{L}$$

where L is the block length and $\mu_B$ is the BLMS step size parameter. The vector form of the algorithm consists of the following L×N matrix and L×1 column vectors, respectively:

$$X_{L,N}=[x(kL)\,x(kL+1)\ldots x(kL+L-1)]^T,$$

$$d(k)=[d(kL)\,d(kL+1)\ldots d(kL+L-1)]^T,$$

$$y(k)=[y(kL)\,y(kL+1)\ldots y(kL+L-1)]^T,$$

$$e(k)=[e(kL)\,e(kL+1)\ldots e(kL+L-1)]^T$$

The BLMS vector equations are defined as follows:

$$y(k)=X(k)w^*(k)$$

$$e(k)=d(k)-y(k)$$

and, the weight adaptation rewritten using $X(k)$ becomes:

$$w(k+1)=w(k)+2\mu_B/L\,X^T(k)e^*(k)$$

The following relation defines the BLMS algorithm misadjustment:

$$M_B \sim \mu_B/(L \times \mathrm{trace}[R_{xx}]) \text{ for } M_B \leq 0.1$$

and $$\mu_B = L\,\mu$$

Figure 3:
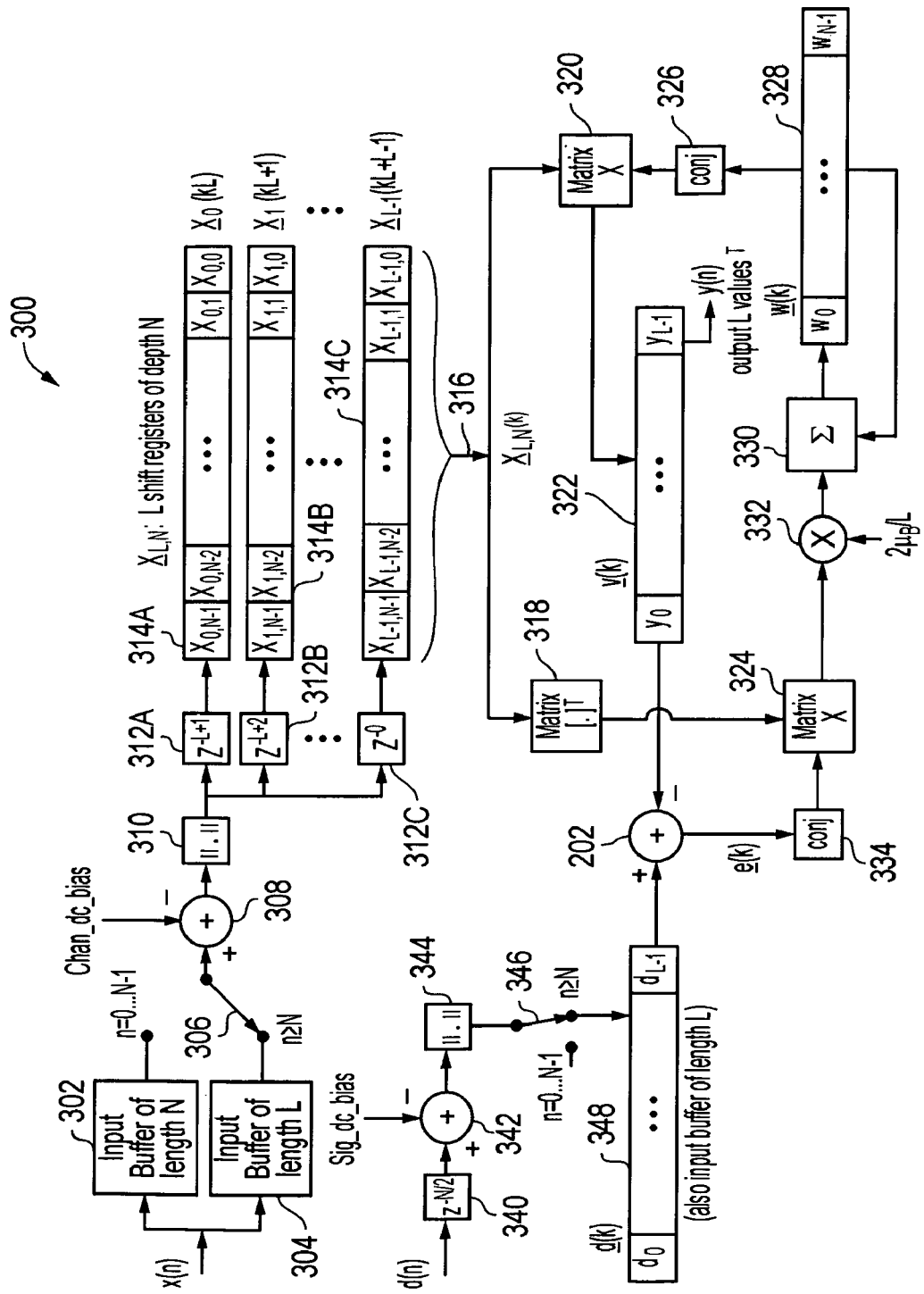
FIG. 3 is a block diagram of an embodiment for the adaptive channel equalizer of FIG. 2C that uses a block least means square (BLMS) architecture.

FIG. 3 is a block diagram of an embodiment for the adaptive channel equalizer of FIG. 2C that uses a binary least means square (BLMS) architecture. For this embodiment 300, N represents the number of filter weights. L represents the block size, such that L/N is an integer. And k represents the block number.

In operation mode, the digital signals x(n) are received by an input buffer 302 of length N and an input buffer 304 of length L. A switch 306 chooses between output signals from input buffers 302 and 304, with samples n=0 . . . N−1 be selected from input buffer 302 and with samples n≧N being selected from input buffer 304. Adder 308 receives the signal from switch 306 as a positive input and receives a channel DC bias (Chan_dc_bias) signal as a negative input. The output of adder 308 is then passed through a normalization block 310. The output of block 310 is then provided to a plurality of delay blocks 312A, 312B . . . 312C, having delay values of $z^{-L+1}$, $z^{-L+2}$ . . . $z^{-0}$, respectively. The outputs from the delay blocks 312A, 312B . . . 312C are then provided to a plurality of shift registers 314A, 314B . . . 314C. In the embodiment depicted, the number of delay blocks and the number of shift registers is equal to L, and the depth of each shift register is N. Shift register 314A has elements $x_{0,N-1}$, $x_{0,N-2}$ . . . $x_{0,1}$, $x_{0,0}$ and represents matrix $x_0(kL)$. Shift register 314B has elements $x_{1,N-1}$, $x_{1,N-2}$ . . . $x_{1,1}$, $x_{1,0}$ and represents matrix $x_1(kL+1)$. And so on, with shift register 314C having elements $x_{L-1,N-1}$, $x_{L-1,N-2}$ . . . $x_{L-1,1}$, $x_{L-1,0}$ and representing matrix $x_{L-1}(kL+L-1)$ Together, the shift registers 314A, 314B . . . 314C represent a two-dimensional matrix 316 of signal values represented by the designation $X_{L,N}(k)$. Matrix 316 is then provided to matrix buffer and transposition ($[.]^T$) circuit 318 and then to matrix multiplier (X) circuit 324. And matrix 316 is provided to matrix multiplier (X) circuit 320. Matrix multiplier circuit 320 receives an input from conjugate (conj) block 326, which receives a matrix input w(k) from buffer 328 that represents the filter transfer function, and outputs filtered values to output buffer 322. Output buffer 322 can be of length L, include elements $y_0$ . . . $y_{L-1}$, and can represent a matrix y(k). The output buffer 322 also provides the filtered digital output signals y(n), such that N values are provided for n=0 . . . N−1 and such that L values are provided for n≧N.

In calibration mode, the desired calibration digital signals d(n) are passed through delay ($z^{-N/2}$) block 340 and received as a positive input to adder 342. Adder 342 also receives a signal DC bias (sig_dc_bias) signal as a negative input. The output from adder 342 is passed through normalization block 344. For samples n=0 . . . N−1, switch 346 provides an open circuit, and for samples n≧N, switch 346 provides samples to input buffer 348. Input buffer 348 can be of length L, include elements $d_0$ . . . $d_{L-1}$, and can represent a matrix d(k). Input buffer 348 provides a positive input to adder 202, and the output buffer 322 provides a negative feedback input signal to adder 202. Adder 202 provides a matrix error signal e(k) as an output that is passed through conjugate (conj) block 334, which creates a conjugated version of the matrix error signal e(k). The matrix multiplier (X) block 324 multiplies the conjugated matrix error signal e(k) and the input matrix digital signal $X_{L,N}(k)$ to produce output signals that represent error correction signals. The multiplier 332 multiplies these error correction signals with the scalar signal $2\ \mu_B/L$. The buffer 328 represents a filter transfer matrix w(k) of length L that includes values $w_0 \ldots w_{N-1}$. The output from buffer 328 is passed through conjugate (conj) block 326 and then provided as an input to matrix multiplier (X) 320. The output of multiplier 332 is provided to summation block 330, which sums the weight adaptation product signals with the filter transfer matrix w(k) 328. The output of summation block 330 is provided back to buffer 328 to update the values stored in this buffer. In this way, the filter transfer matrix w(k) is cumulatively updated with error corrected values.

To describe the embodiment 300 of FIG. 3 in more detail, this embodiment depicts a block diagram of a BLMS adaptive equalizer implementation for use in a DSP processor or FPGA firmware type application. The first n=0:N−1 values of x(n) and d(n) are input to initiate the equalization process of the data. Any DC bias is removed from the x(n) and d(n) values input followed by magnitude normalization. The x(n) values are then loaded into the $X_{L,N}$ matrix composed of L shift registers, each of depth N where the oldest value is the rightmost column. The first row is the oldest group of N values and the last row is the newest group of N values. The input d(n) values are delayed by N/2 samples (for example, with the insertion of N/2 zeros) in order to align d(n) with the x(n) data. The initial N values of d(n) input are discarded. The block processing of L samples per block now begins (k=0). The next L samples are input and buffered for x(n) and d(n) to create the matrices X(k=0) and d(k). The new value of y(k) is computed by storing the result from the L×N matrix multiply operation of X(k) with the conjugate of the current contents of the N×1 matrix, w(k). The L values for the new y(k) are buffered for serial output at the end of processing the current block k.

The next series of operations are performed to determine the updated w(k) for use in the next block, k+1. e(k) is formed by the matrix subtraction operation of the contents of d(k) with the contents of y(k). A matrix transpose operation on matrix X(k) is performed followed by an N×L matrix multiply of $X^T(k)$ with the L×1 matrix of e*(k). Finally, the resultant N×1 matrix is multiplied by scalar $2^* \ \mu_B/L$, added element-by-element to the contents of w(k) and stored in w(k) for use by the next block update process. The L values contained in y(k) and this process is repeated for the next block (k=k+1) by inputting the next block of L samples x(n=n+1 ... n+L) and d(n=n+1 ... n+L) into the input buffers for x(k=k+1) and d(k=k+1), respectively. Memory is retained for all registers and buffers from the processing of one block to the next. The final values of w(k) are provided for use in the operational mode once the adaptation process has been completed.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A wideband passive receiver system for a passive electronic intelligence surveillance system having channel equalization, comprising:

a wideband passive receiver coupled to selectively receive an RF input signal spectrum or an RF calibration input signal, the receiver being configured to output digital signals representing the RF input signal spectrum or the RF calibration input signal, the RF input signal spectrum comprising signals from unknown signal sources and the receiver operating subject to environmental distortions;

an equalizing filter coupled to receive the digital signals from the receiver, the filter having a filter response controlled by time-varying filter control signals and being configured to output filtered digital signals, the equalizing filter being configured to provide adaptive equalization of transfer function characteristics for the wideband passive receiver;

a calibration signal generator configured to generate a wideband RF calibration signal to provide the RF calibration input signal for the receiver and configured to generate a desired output signal based upon the generated RF calibration input signal, the calibration signal generator being further configured to generate the wideband RF calibration signals and the desired output signals periodically over time to provide calibration dwells for the receiver system during its operation; and equalizer control circuitry coupled to receive the filtered digital signals as feedback and coupled to receive the desired output signal from the calibration signal generator, the equalizer control circuitry being configured to generate the time-varying filter control signals to provide adaptive equalization of the transfer function characteristics for the wideband passive receiver, and the filter control signals being configured to correct distortions caused by operational variations in the transfer function characteristics of the receiver system operating subject to environmental distortions.

2. The wideband passive receiver system of claim 1, wherein the distortions comprise distortions inherent to analog circuitry within the receiver system that may cause variations in the transfer function characteristics due to internal or external operational conditions.

3. The wideband passive receiver system of claim 2, wherein the analog circuitry has a non-linear transfer characteristics that may vary in time during operation.

4. The wideband passive receiver system of claim 1, wherein the equalizer control circuitry comprises an adder configured to subtract the feedback signal from the desired output signal to produce an error correction signal and equalizer algorithm control circuitry configured to receive the error correction signal from the adder.

5. The wideband passive receiver system of claim 1, further comprising a rate converter coupled to the output of the receiver and configured to provide an input to the equalizing filter.

6. The wideband passive receiver system of claim 1, further comprising signal processing circuitry coupled to receive the output of the equalizing filter.

7. The wideband passive receiver system of claim 6, wherein the signal processing circuitry is configured to perform electronic intelligence signal processing or configured to perform specific emitter identification signal processing.

8. The wideband passive receiver system of claim 1, wherein the receiver comprises an RF signal detector, an anti-aliasing filter and an analog-to-digital converter.

9. The wideband passive receiver system of claim 1, wherein the equalizing filter comprises a FIR filter having coefficients set by the equalizer control circuitry.

10. The wideband passive receiver system of claim 1, wherein the equalizer control circuitry comprises circuitry configured to model circuitry within the receiver and wherein the model circuitry processes the desired output signal.

11. A channel equalizer system for a wideband passive receiver for a passive electronic intelligence surveillance system, comprising:
    an equalizing filter coupled to receive digital signals from a receiver operating subject to environmental distortions, the equalizing filter having a filter response controlled by time-varying filter control signals and being configured to output filtered digital signals, the equalizing filter being configured to provide adaptive equalization of transfer function characteristics for the wideband passive receiver, and the digital signals being representative of an RF input signal spectrum comprising signals from unknown signal sources;
    a calibration signal generator configured to generate a wideband RF calibration signal to provide as a selectable RF calibration input signal to the receiver and configured to generate a desired output signal based upon the generated RF calibration input signal, the calibration signal generator being further configured to generate the wideband RF calibration signals and the desired output signals periodically over time to provide calibration dwells for the receiver during its operation; and
    equalizer control circuitry coupled to receive filtered digital signals as feedback and coupled to receive the desired output signal from the calibration signal generator, the equalizer control circuitry being configured to generate the time-varying filter control signals to provide adaptive equalization of the transfer function characteristics for the wideband passive receiver, and the filter control signals being configured to correct distortions caused by operational variations in the transfer function characteristics of the receiver operating subject to environmental distortions.

12. The channel equalizer system of claim 11, wherein the distortions comprise distortions inherent to analog circuitry within the receiver system that may cause variations in the transfer function characteristics due to internal or external operational conditions.

13. The channel equalizer system of claim 12, wherein the analog circuitry has a non-linear transfer characteristics that may vary in time during operation.

14. The channel equalizer system of claim 11, wherein the equalizer control circuitry comprises an adder configured to subtract the feedback signal from the desired output signal to produce an error correction signal and equalizer algorithm control circuitry configured to receive the error correction signal from the adder.

15. The channel equalizer system of claim 11, wherein the equalizing filter comprises a FIR filter having coefficients set by the equalizer control circuitry.

16. The channel equalizer system of claim 11, wherein the digital signals received by the equalizing filter are complex digital signals.

17. The channel equalizer system of claim 11, wherein the digital signals received by the equalizing filter are real digital signals.

18. The channel equalizer system of claim 11, wherein the equalizer control circuitry comprises a block least means square (BLMS) architecture.

19. The channel equalizer system of claim 11, wherein the equalizer control circuitry comprises circuitry configured to model circuitry within the receiver and wherein the model circuitry processes the desired output signal.

20. A method for equalizing a channel within a wideband passive receiver system for a passive electronic intelligence surveillance system, comprising:
    selectively receiving an RF input signal spectrum or an injected RF calibration input signal and processing the input signal to produce digital output signals, the RF input signal spectrum comprising signals from unknown signal sources and the receiver operating subject to environmental distortions;
    filtering the digital signals to produced equalized digital output signals, the filtering being controlled by time-varying filter control signals and being configured to provide adaptive equalization of transfer function characteristics for the wideband passive receiver system; and
    periodically selecting to receive the RF calibration input signal over time to provide calibration dwells for the receiver system during its operation, and when the injected RF calibration input signal is selectively received:
        generating a wideband RF calibration signal to provide the injected RF calibration input signal and generating a desired output signal based upon the generated RF calibration input signal; and
        processing the equalized digital output signals as feedback and the desired output signal to generate the time-varying filter control signals to provide adaptive equalization of the transfer function characteristics for the wideband passive receiver, and the filter control signals being configured to correct distortions caused by operational variations in transfer function characteristics of the receiver system operating subject to environmental distortions.

21. The method of claim 20, wherein the distortions comprise distortions inherent to analog circuitry within the receiver system that may cause variations in the transfer function characteristics due to internal or external operational conditions.

22. The method of claim 21, wherein the analog circuitry has a non-linear transfer characteristics that may vary in time during operation.

23. The method of claim 20, wherein the processing step comprises subtracting the feedback signal from the desired output signal to produce an error correction signal and utilizing the error correction signal to generate the filter control signals.

24. The method of claim 20, further comprising performing additional signal processing on the equalized digital output signals.

25. The method of claim 24, wherein the additional signal processing circuitry comprises electronic intelligence signal processing or specific emitter identification signal processing.

26. The method of claim 20, wherein filtering step comprises utilizing a FIR filter having coefficients determined by the filter control signals.

27. The method of claim 20, wherein the processing step comprises utilizing circuitry that models circuitry within the receiver system to processes the desired output signal.

* * * * *